(12) United States Patent
Schade (10) Patent No.: US 10,981,225 B2
(45) Date of Patent: Apr. 20, 2021

(54) METHOD AND DEVICE FOR MANUFACTURING A THREE-DIMENSIONAL OBJECT

(71) Applicant: EOS GmbH Electro Optical Systems, Krailling (DE)

(72) Inventor: Martin Schade, Munich (DE)

(73) Assignee: EOS GmbH Electro Optical Systems, Krailling (DE)

( * ) Notice: Subject to any disclaimer, the term of this patent is extended or adjusted under 35 U.S.C. 154(b) by 223 days.

(21) Appl. No.: 15/778,429

(22) PCT Filed: Nov. 25, 2016

(86) PCT No.: PCT/EP2016/078757
§ 371 (c)(1),
(2) Date: May 23, 2018

(87) PCT Pub. No.: WO2017/089510
PCT Pub. Date: Jun. 1, 2017

(65) Prior Publication Data
US 2018/0345582 A1 Dec. 6, 2018

(30) Foreign Application Priority Data
Nov. 26, 2015 (DE) ...................... 10 2015 223 474.6

(51) Int. Cl.
*B29C 64/153* (2017.01)
*B22F 3/105* (2006.01)
(Continued)

(52) U.S. Cl.
CPC .......... *B22F 3/1055* (2013.01); *B29C 64/153* (2017.08); *B29C 64/205* (2017.08);
(Continued)

(58) Field of Classification Search
CPC ........... B22F 2003/1056; B29C 64/205; B29C 64/153; B29C 64/393
See application file for complete search history.

(56) References Cited

U.S. PATENT DOCUMENTS 6,492,651 B2   12/2002  Kerekes
2002/0104973 A1  8/2002  Kerekes
(Continued)

FOREIGN PATENT DOCUMENTS

DE   102005015870   10/2006
DE   102011111818    2/2013
(Continued)

OTHER PUBLICATIONS

Perret DE102013208651 Translation (Year: 2014).*
International Search Report for Application No. PCT/EP2016/078757 dated Feb. 15, 2017, 5 pages.

*Primary Examiner* — Jacob T Minskey
*Assistant Examiner* — Adrien J Bernard
(74) *Attorney, Agent, or Firm* — Seyfarth Shaw LLP (57) ABSTRACT

A recoater for applying a building material in a device for manufacturing a three-dimensional object within a build area by solidifying layers of the building material at the points corresponding to the respective cross-section of the object is suitable for applying a building material layer by moving across the build area in a movement direction. The recoater comprises a first scanning device including a first line sensor, for capturing at least a subarea of the build area.

16 Claims, 4 Drawing Sheets

(51) Int. Cl.
*B33Y 10/00* (2015.01)
*B33Y 30/00* (2015.01)
*B33Y 50/02* (2015.01)
*B29C 64/393* (2017.01)
*B29C 64/205* (2017.01)

(52) U.S. Cl.
CPC ............ *B29C 64/393* (2017.08); *B33Y 10/00* (2014.12); *B33Y 30/00* (2014.12); *B33Y 50/02* (2014.12); *B22F 2003/1056* (2013.01); *B22F 2003/1057* (2013.01); *Y02P 10/25* (2015.11)

(56) References Cited

U.S. PATENT DOCUMENTS

| | | |
|---|---|---|
| 2007/0196561 A1 | 8/2007 | Philippi et al. |
| 2012/0325933 A1 | 12/2012 | Blum |
| 2014/0159266 A1 | 6/2014 | Bamberg et al. |
| 2015/0158249 A1 | 6/2015 | Goto |
| 2015/0273583 A1 | 10/2015 | Bumgardner |
| 2016/0082668 A1 | 3/2016 | Perret et al. |
| 2016/0214319 A1 | 7/2016 | Wiel et al. |
| 2017/0232666 A1* | 8/2017 | Flitsch .................. B22F 3/008 264/31 |
| 2017/0361500 A1* | 12/2017 | Hochsmann ............ B29C 64/25 |

FOREIGN PATENT DOCUMENTS

| | | |
|---|---|---|
| DE | 102013208651 | 11/2014 |
| EP | 1296788 | 1/2005 |
| EP | 2832473 | 2/2015 |
| WO | 2015032974 | 3/2015 |

* cited by examiner

METHOD AND DEVICE FOR MANUFACTURING A THREE-DIMENSIONAL OBJECT

TECHNICAL FIELD OF THE INVENTION

The present invention relates to a method and a device for manufacturing a three-dimensional object by a layer-by-layer application and selective solidification of a building material in powder form.

BACKGROUND OF THE INVENTION

Methods and devices of this type are, for instance, used in Rapid Prototyping, Rapid Tooling, or Additive Manufacturing. An example of such a method is known as the "selective laser sintering or laser melting". In the course of this, a thin layer of a building material in powder form is repeatedly applied, and the building material in each layer is selectively solidified by selectively irradiating it using a laser beam.

It is known for such methods and devices to make optical recordings of the applied and/or solidified powder layer, to evaluate those and, depending on the result of the evaluation, as the case may be, to intervene in the manufacturing process and control it.

EP 1 296 788 B1 discloses a method of manufacturing a three-dimensional object by a layer-by-layer melting of a material in powder form at the points of the respective layer which correspond to the object by means of an electron beam gun. For capturing the surface properties of a surface layer in the powder bed, a camera is used which partly measures the temperature distribution of the surface layer and partly captures the incidence of surface irregularities due to shadow information generated by these irregularities.

DE 10 2005 015 870 B3 describes a device and a method for manufacturing three-dimensional objects by locally solidifying layers of a building material at the points corresponding to the respective cross-section of the object by exposure to electromagnetic or particle radiation. The device includes a temperature measurement device for a non-contact measurement of the temperature of the building material in a measurement area which is a subarea of the layer of the building material, and further a position adjustment device for changing the position of the measurement area of the temperature measurement device. In a modification of the described embodiment an IR camera is used as temperature measurement device, in another modification a single-line CCD camera having a measurement area extended along a first direction whose position in a second direction perpendicular to the first direction is changeable.

DE 10 2013 208 651 A1 describes a method of automatically calibrating a device for a generative manufacturing of a three-dimensional object including more than one irradiation device. In the course of this, for instance, an applied layer of a material or of a target is irradiated by the first irradiation device in order to generate a first test pattern, and then an applied layer of a material or a target is irradiated by the second irradiation device in order to generate a second test pattern. Both test patterns are captured by a camera and compared with each other or with a reference pattern.

U.S. Pat. No. 6,492,651 B1 describes an SDM method (Selective Deposition Modeling) in which an elevation information is obtained at predetermined points by means of a laser triangulation. In the course of this, a laser radiates a beam perpendicularly onto a region to be measured, and the scattered light is focused to an optical sensor whose optical axis is aslant to the laser beam. Alternatively, the optical axis of the sensor is perpendicular and the laser beam is incident aslant.

SUMMARY OF THE INVENTION

It is the object of the present invention to provide an alternative, preferably improved method or, respectively, an alternative, preferably improved device for manufacturing a three-dimensional object by a layer-by-layer application and selective solidification of a building material with which it is possible to carry out a method of process control with the aid of an optical capturing of at least a subarea of the build area.

The object is achieved by a recoater according to claim 1, a device according to claim 8, a method of process control according to claim 10, and a method for manufacturing a three-dimensional object according to claim 15. Further developments of the invention are respectively provided in the dependent claims. In the course of this, each of the independent claims may be further developed by the dependent claims of the other independent claims as well as by the features of the devices and methods set forth in the description.

The recoater according to the invention serves for applying a building material in a device for manufacturing a three-dimensional object within a build area by solidifying layers of the building material at the points corresponding to the respective cross-section of the object. The recoater is suitable for applying a building material layer by moving across the build area in a movement direction and comprises a first scanning device including a first line sensor for capturing at least a subarea of the build area. The use of such a recoater makes it possible, for instance, to carry out a method of process control with the aid of an optical capturing of at least a subarea of the build area.

Preferably, the first scanning device is arranged in front of or behind the recoater in the movement direction of the recoater. Thereby it may, for instance, be set whether the scanning device records an image of a layer already selectively solidified or an image of a newly applied layer.

Preferably, the recoater further comprises a second scanning device including a second line sensor for capturing at least a subarea of the build area, wherein the second scanning device is preferably arranged on the other side of the recoater in the movement direction of the recoater than the first scanning device. Thereby, for instance, both an image of a layer already selectively solidified and an image of a newly applied layer can be recorded.

Preferably, the longitudinal extension of the first and/or second line sensor is transverse, in particular perpendicular, to the movement direction of the recoater for the material application, and a recording area of the first and/or second line sensor preferably extends substantially along the total area of the recoater suitable for the application of the building material. Thereby, for instance, a two-dimensional image of the build area can be advantageously recorded.

Preferably, the first and/or second line sensor comprises a CCD line sensor, a CMOS line sensor, or a line of photodiodes, bolometers, or pyroelectric sensors. These sensors are, for instance, well suited to record an image of the build area.

Preferably, the first and/or second scanning device includes a light source which preferably extends along a total recording area of the first and/or second line sensor, wherein the light source is preferably formed by an elongated light source or by an array of point-shaped light sources. Thereby, for instance, a good image of the build area can be recorded even under unfavourable light conditions.

Preferably, the first and/or second scanning device is at least in parts detachably mounted at the recoater. Thereby, for instance, the first and/or second scanning device can be easily disconnected from the recoater when needed.

A device according to the invention for manufacturing a three-dimensional object within a build area by solidifying layers of a building material at the points corresponding to the respective cross-section of the object comprises a recoater movable across the build area and being suitable for applying a building material layer by moving across the build area in a movement direction and at least one scanning device movable across the build area and including a line sensor suitable for capturing at least a subarea of the build area. In such a device it is, for instance, possible to carry out a method of process control with the aid of an optical capturing of at least a subarea of the build area.

Preferably, the scanning device includes a light source whose light emitting area preferably extends along a total recording area of the line sensor and which is preferably formed by an elongated light source or by an array of point-shaped light sources, and/or the scanning device is mounted at the recoater, preferably at least in parts detachably mounted at the recoater, and/or the device includes a wiper mounted outside the build area and preferably having a wiping lip or a brush for wiping an optical window of the scanning device. Thereby, for instance, a good image of the build area can be recorded even under unfavourable light conditions, and/or the scanning device can, for instance, be moved across the build area in a simple manner without requiring its own drive, and/or the optical window of the scanning device can, for instance, be cleansed of impurities.

The method of process control according to the invention is carried out in a device for manufacturing a three-dimensional object of the type described above, wherein at least a subarea of the build area is captured by means of the scanning device including the line sensor. Such a method makes it possible, for instance, to carry out a process control based on the results obtained with the aid of the optical capturing of at least a subarea of the build area.

Preferably, based on the image of at least the subarea of the build area captured by the scanning device, unevenness and/or defects in the newly applied layer are captured and/or dimensions and/or surface finish of the solidified regions of the layer already selectively solidified are captured. Thereby, for instance, a quality control can be carried out based on the captured image of the build area, and measures can be taken to improve the quality.

Preferably, a device is used including an irradiation unit capable of emitting a wave or particle radiation suitable for solidifying the building material, wherein the process control includes a calibration of the irradiation unit comprising the following steps: moving the scanning device across a test pattern having predetermined dimensions and recording an image of the test pattern, comparing the recorded image with the predetermined dimensions of the test pattern and determining first correction data for calibrating the scanning device, irradiating reference marks having predetermined desired positions by means of the irradiation device on a light-sensitive target or an applied layer of the building material, moving the scanning device across the irradiated target or the irradiated layer and recording an image of the reference marks, comparing the actual positions of the reference marks determined by means of the first correction data from the recorded image with their desired positions and determining second correction data for calibrating the irradiation device. Such a method makes it, for instance, possible to calibrate the irradiation device such that the light always hits the desired positions of the build area with sufficient accuracy.

Preferably, a device is used including a vertically adjustable support carrying a building platform on which the object is to be built up or serving itself as a building platform, wherein the process control includes a determination of the alignment of the scanning device relatively to the support or the building platform comprising the following steps: applying a test pattern having reference marks to the support or the building platform, repeatedly moving the scanning device across the test pattern and recording an image of the test pattern, wherein the support is lifted or lowered by a predetermined height at each repetition, determining which reference mark in which image is reproduced most sharply, and determining for at least two reference marks an angle at which a connecting line between the reference marks is tilted with respect to a plane covered by the movement of the scanning device, from the number of images lying between the images in which the reference marks are reproduced most sharply and the distance of the reference marks from each other. Such a method makes it, for instance, possible to capture and to correct a tilt between the support and the application plane.

Preferably, a device is used including a vertically adjustable support carrying a building platform on which the object is to be built up or serving itself as a building platform, wherein the process control includes a determination of the evenness of the support or of the building platform comprising the following steps: applying a test pattern having reference marks to the support or the building platform or irradiating the reference marks directly on the support or the building platform, repeatedly moving the scanning device across the reference marks and recording an image of the reference marks, wherein the support is lifted or lowered by a predetermined height at each repetition, determining which reference mark in which image is reproduced most sharply, and determining an elevation profile of the support or of the building platform from the images in which the reference marks are reproduced most sharply and the positions of the respective reference marks. Such a method makes it, for instance, possible to inspect an evenness of the support and to take it into account in the further process.

The method of manufacturing a three-dimensional object according to the invention comprises the steps of: applying a layer of a material in powder form using a recoater by moving the recoater across a build area; solidifying the layer at the points corresponding to a cross-section of the object; and repeating the steps of applying and solidifying until the three-dimensional object is completed, wherein in the course of a process control method of the type described above the build area is at least partially scanned by the scanning device during a layer application. Such a method makes it, for instance, possible to manufacture a three-dimensional object by means of a process control carried out based on the results obtained with the aid of the optical capturing of at least a subarea of the build area.

Further features and the usefulness of the invention will arise from the description of examples of embodiments on the basis of the accompanying drawings.

DETAILED DESCRIPTION OF THE EMBODIMENTS

Figure 1:
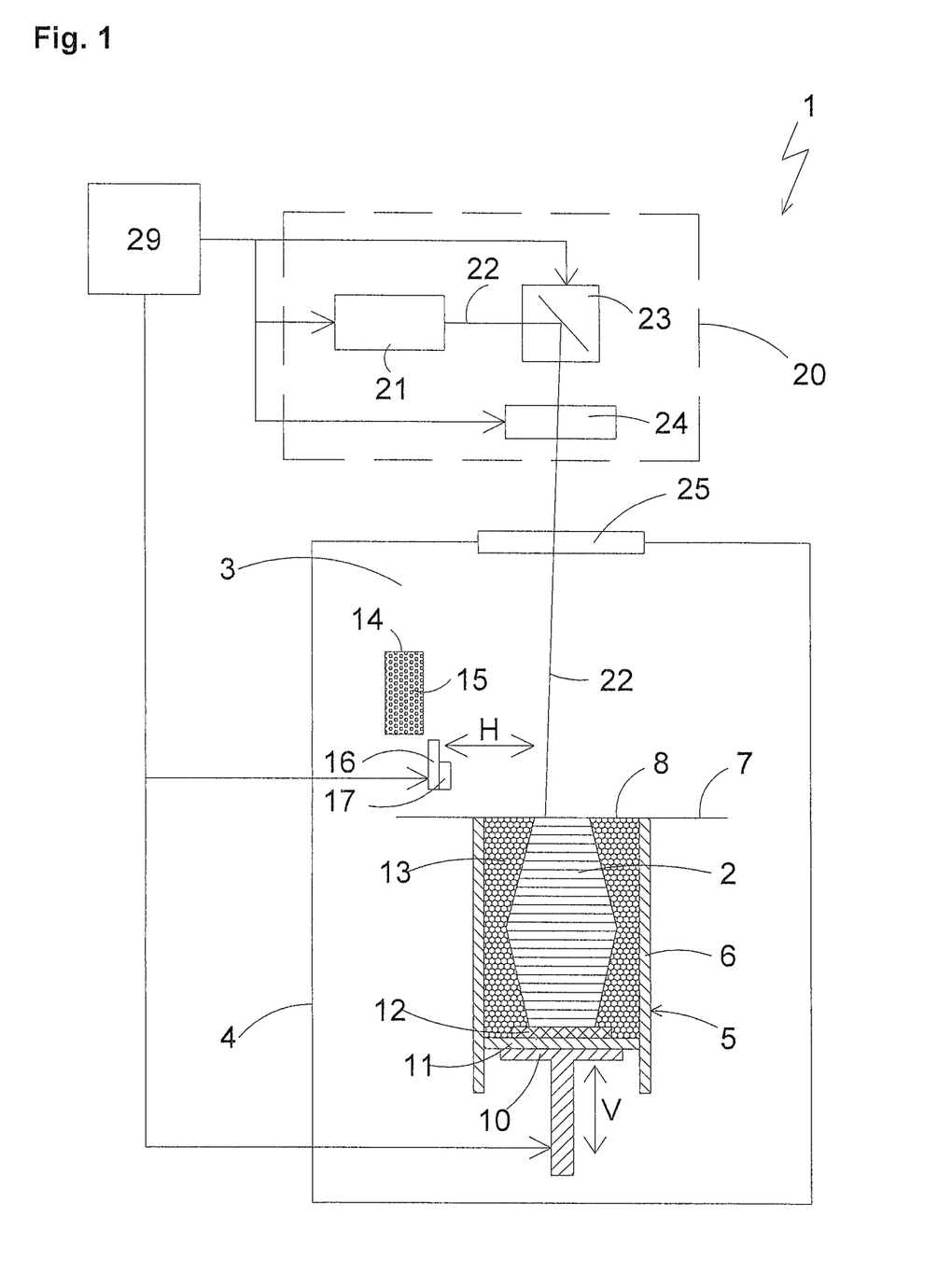
FIG. 1 is a schematic, partially cross-sectional view of a device for a layer-by-layer manufacturing of a three-dimensional object according to a first embodiment of the present invention.

In the following, an example of an embodiment of a device 1 according to a first embodiment of the present invention is described referring to FIG. 1. The device shown in FIG. 1 is a laser sintering or laser melting device 1. For building up an object 2, it contains a process chamber 3 having a chamber wall 4.

In the process chamber 3 a container 5 open to the top and having a wall 6 is arranged. By the upper opening of the container 5 a working plane 7 is defined, wherein the region of the working plane 7 lying within the opening which can be used for building up the object 2 is denoted as build area 8.

In the container 5 a support 10 movable in a vertical direction V is arranged at which a base plate 11 is mounted which closes the container 5 in a downward direction and thereby forms its bottom. The base plate 11 may be a plate formed separately from the support 10, which is attached to the support 10, or it may be integrally formed with the support 10. Depending on a powder used and a process, a building platform 12 on which the object 2 is built up may further be mounted on the base plate 11. However, the object 2 may also be built up on the base plate 11 itself, which then serves as a building platform. In FIG. 1, the object 2 to be built in the container 5 on the building platform 12 is shown below the working plane 7 in an intermediate state having several solidified layers surrounded by building material 13 remaining non-solidified.

The laser sintering device 1 further contains a storage container 14 for a building material 15 in powder form which can be solidified by an electromagnetic radiation and a recoater 16 movable in a horizontal direction H for applying the building material 15 to the build area 8. In the process chamber a scanning device 17 is further arranged which is mounted at the recoater 16.

The laser sintering device 1 further contains an irradiation device 20 having a laser 21 generating a laser beam 22 deflected via a deflecting device 23 and focused by a focusing device 24 via a coupling window 25, which is mounted at the upper side of the process chamber 3 in its wall 4, onto the working plane 7.

The laser sintering device 1 further contains a control unit 29 via which the individual component parts of the device 1 are controlled in a coordinated manner for performing the building process. The control unit may contain a CPU whose operation is controlled by a computer program (software). The computer program may be stored separately from the device on a storage medium, from which it can be loaded into the device, in particular, into the control unit.

During operation, first, the support 10 is lowered for the application of a powder layer by a height corresponding to the desired layer thickness. By moving the recoater 16 across the working plane 7 a layer of the building material 15 in powder form is then applied. The application is performed at least over the total cross-section of the object 2 to be manufactured, preferably across the whole build area 8, i.e. the region of the working plane 7 which can be lowered by a vertical movement of the support. Subsequently, the cross-section of the object 2 to be manufactured is scanned by the laser beam 22, so that the building material 15 in powder form is solidified at the points corresponding to the cross-section of the object 2 to be manufactured. These steps are repeated as long as until the object 2 is completed and can be removed from the build space.

When moving the recoater 16 across the working plane 7, the scanning device 17 is moved together with it and, in the course of this, scans the working plane 7.

Figure 2:
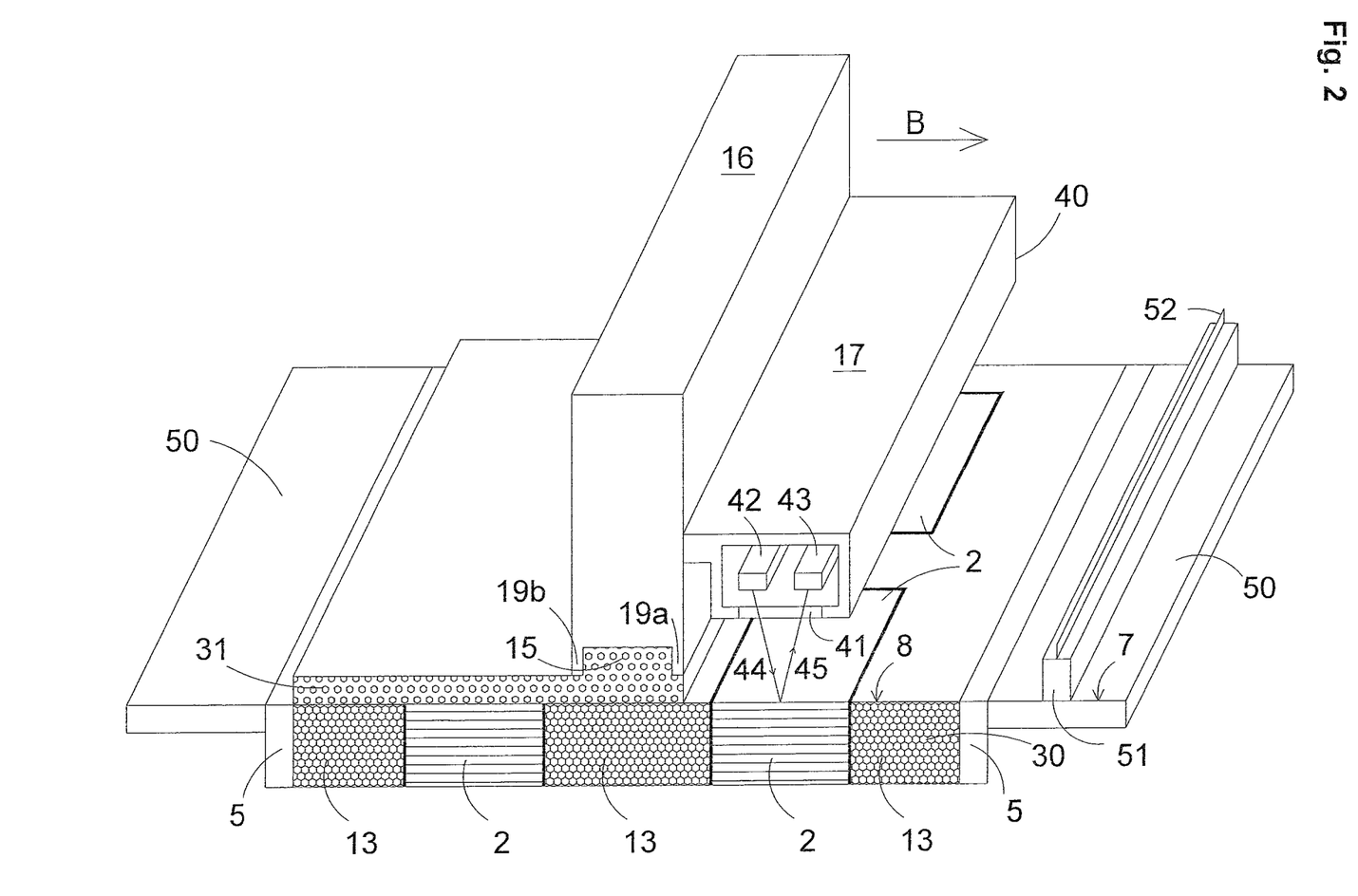
FIG. 2 is a schematic, not drawn to scale, perspective partial view of a region inside the device shown in FIG. 1 and shows, inter alia, a recoater according to the first embodiment included therein.

FIG. 2 is a schematic, not drawn to scale, perspective partial view of a region inside the process chamber 3 of the device 1 shown in FIG. 1. In particular, FIG. 2 shows the recoater 16 with the scanning device 17 mounted at it. In the course of this, the scanning device 17 is preferably mounted at the recoater such that at least parts of it are detachable from the recoater 16 for cleaning or maintenance purposes or for replacing them.

In a powder bed 30 built up by preceding process steps, the solidified part of the object 2 to be manufactured is surrounded by powder 13 remaining non-solidified. By means of a movement of the recoater 16 in an application direction B, a further powder layer 31 of the building material 15 is applied to the last previously applied and selectively solidified powder layer.

The recoater contains a blade arranged at the front in the application direction B (front blade 19a) and a blade arranged at the rear in the application direction B (rear blade 19b). These two blades at least partially close an interspace in the application direction B and in the direction opposite to the application direction. This interspace confined by the two blades 19a, 19b is configured such as to receive a stock of building material 15 in powder form. Transversely, preferably perpendicularly to the application direction B, the two blades 19a, 19b and thus also the interspace confined thereby extend across the total width of the area to which building material is to be applied, preferably across the total build area 8. By this extension, the area of the recoater suitable for applying the building material is defined.

When the recoater 16 is moved in the application direction B, a portion of the building material 15 in powder form remains on the powder bed 30 and is stretched by the rear blade 19b to a uniform thin powder layer 31. The applied powder amount is determined by the height interval between the lower edge of the rear blade 19b and the powder bed 30.

According to the present embodiment, the scanning device 17 is arranged in front of the recoater 16 in the application direction B, i.e. the movement direction of the recoater 16. The scanning device 17 comprises a housing 40 having a translucent window 41 downwardly directed towards the powder bed 30. An elongated light source 42 and a light-sensitive line sensor 43 are arranged in the housing. Within the scope of the present invention, the term "light" is not limited to the visible spectrum alone, but can also comprise adjacent wave length ranges, such as the infrared or the ultraviolet range.

The line sensor 43 contains an array of light-sensitive elements and can thus measure a spatial distribution of the light intensity along the array. The window 41, a light emitting area of the light source 42, i.e. the area of the light source 42 capable of emitting light, and a recording area of the line sensor 43, i.e. the area of the line sensor 43 suitable for capturing light, extend transversely, preferably perpendicularly to the application direction B substantially along the total area of the recoater 16 suitable for the application of the building material.

Outside the build area 8, a work table 50 is mounted in the working plane 7. On this work table 50, a wiper 51 is mounted including a wiping element 52, which is preferably formed as a wiping lip or a brush. The wiper 51 is mounted such that the scanning device 17 is moved across the wiper 51 at the end of the movement of the recoater 16 across the build area 8. In the course of this, the wiping element 52 wipes off possible impurities from the window 41 of the scanning device 17, so that the operation of the scanning device 17 is not impaired by the impurities.

Line scanners having a light source and a line sensor are known in the field of technology, for instance for scanning documents in fax machines, scanners, or copiers. For the present application, any elements or, respectively, methods known in the state of the art may be used, in particular also optical elements for bundling emitted and received light which are not shown in FIG. 2 for the sake of clarity, as far as they are applicable under the environmental conditions existing in the device.

Thus, the light source 42 may be formed as an elongated cold-light source, for instance, in the form of a fluorescent tube, or as an array of point-shaped light sources, such as light-emitting diodes.

The line sensor 43 may, for instance, comprise a CCD line sensor, a CMOS line sensor, or an array of individual photodiodes. It may also be built up of thermal receiving elements, such as an array of bolometers or pyroelectric sensors.

Light source 42 and line sensor 43 may, as known from the state of the art, be configured for a colour-independent operation, wherein only the light intensity is evaluated, and a colour operation, wherein an evaluation of the colour is also carried out.

Light 44 emitted by the light source 42 hits the powder bed 30, is reflected thereby, and reaches, as reflected light 45, the line sensor 43 which converts it into an electric signal and outputs this signal.

When recoater 16 is at rest, the scanning device 17 captures a line profile of the reflected light. In the course of this, the spatial resolution in the longitudinal direction of the line sensor 43 is determined by the length of the recording area of the line sensor 43 and the number of the individual sensors contained in it.

When recoater 16 is moving, the scanning device 17 successively captures a plurality of line profiles of the reflected light which respectively correspond to a line on the powder bed 30 scanned at the respective point in time. Thereby, a two-dimensional image of the powder bed 30 or at least of a subarea thereof can be captured. In the course of this, the spatial resolution in the movement direction B of the recoater 16 is determined by the velocity of the recoater 16 in the movement direction B and the repetition rate of the recording of a line profile.

The electric image signal output by the line sensor 43 is evaluated in the control unit 29 or another evaluation unit suitable therefor. Therein, it may, for instance, be converted into an image file and stored in a storage unit. In parallel with capturing the image or after having captured an entire image, the image can be processed and evaluated.

Thus, the device of the present embodiment, in particular, the recoater provided with the scanning device, is capable of capturing a two-dimensional image of at least a subarea of the build area while moving the recoater across the build area. Since the device is operated by means of a method of process control, also the method of process control according to the present embodiment includes the capturing of at least a subarea of the build area.

In the present embodiment, the scanning device 17 is arranged in front of the recoater 16 in the application direction B. Thus, scanning device 17 scans the already selectively solidified preceding layer of the powder bed 30. The solidified points of the object 2 included therein and the powder 13 remaining non-solidified possess differing reflection characteristics and can therefore be distinguished from each other in the recorded image.

So it is, for instance, possible to carry out a measurement of the solidified regions on the basis of the recorded image and to compare these actual values with the predetermined desired values. In the case of a discrepancy, it is possible to intervene in the operation of the device and to control it, for instance, by changing process properties, such as working temperature or movement velocity and power of the laser beam.

It is, for instance, also possible to measure the surface of the solidified regions in order to recognise roughness, pores, cracks etc. Also here it is possible to intervene in the operation of the device and to control it, if required.

Figure 3:
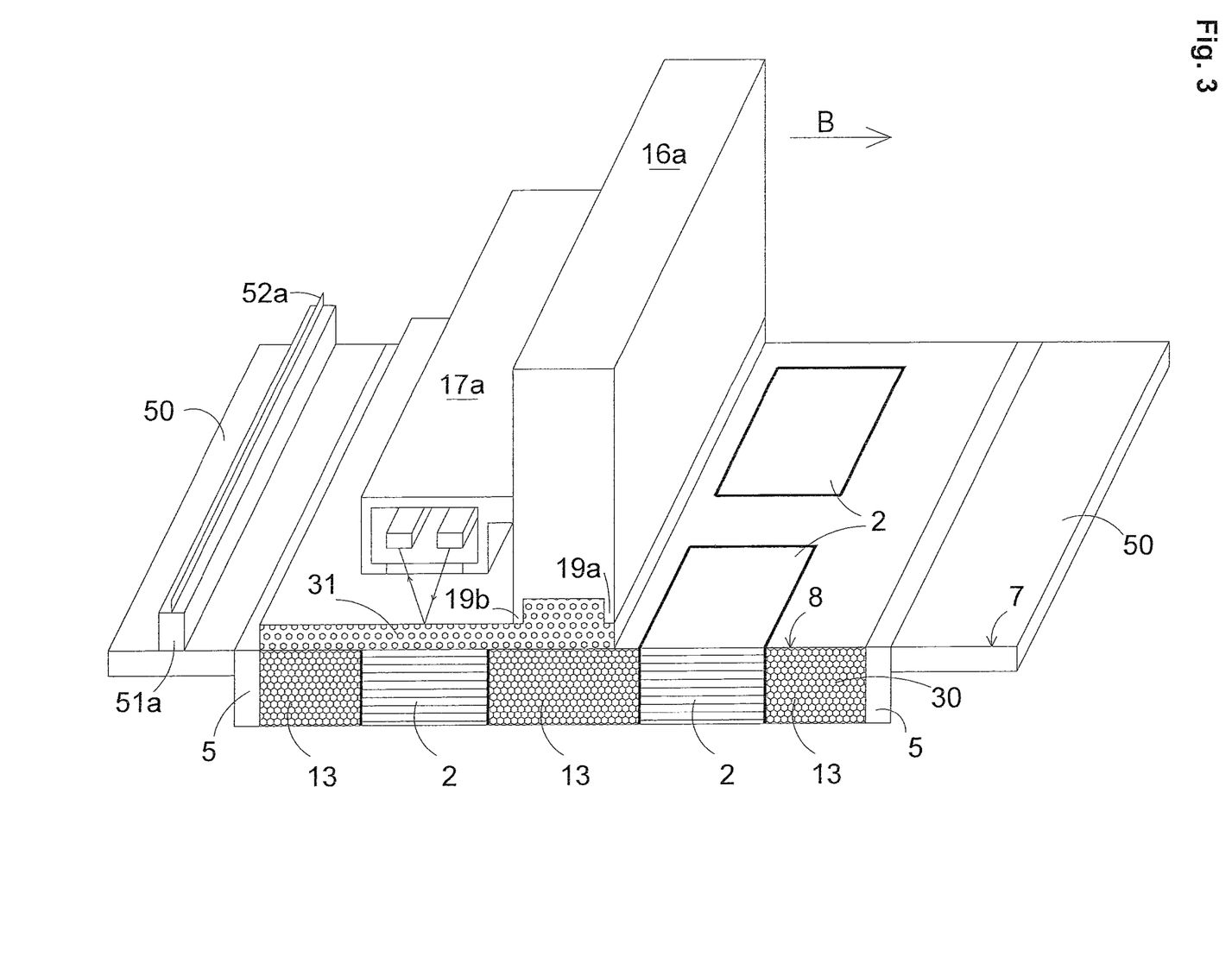
FIG. 3 is a schematic, not drawn to scale, perspective partial view of a region inside the device shown in FIG. 1 and shows, inter alia, a recoater according to a second embodiment of the present invention included therein.

FIG. 3 is a schematic, not drawn to scale, perspective partial view of a region inside the process chamber 3 of the device 1 shown in FIG. 1 and shows, inter alia, a recoater 16a according to a second embodiment of the present invention.

The recoater 16a differs from the recoater 16 shown in FIG. 2 only in that a scanning device 17a is arranged behind the recoater 16a in the application direction B, i.e. the movement direction of the recoater 16a, instead of being arranged in front of it. Correspondingly, also a wiper 51a having a wiping element 52a is arranged on the other side of the build area 8 than shown in FIG. 2.

The scanning device 17a is constructed in a mirror-inverted manner with respect to the scanning device 17 shown in FIG. 2. In other respects, the construction of the recoater 16a and of the scanning device 17a is respectively as described in the first embodiment.

Whereas the scanning device 17 of the first embodiment scans the already selectively solidified preceding layer of the powder bed 30, the scanning device 17a scans the newly applied powder layer 31.

Thereby, the present embodiment is, for instance, capable of capturing unevenness and/or defects in the newly applied layer 31. Based on that, correcting measures can be taken, for instance, a new moving of the recoater across the build area 8 in order to level out the unevenness and/or defects.

Figure 4:
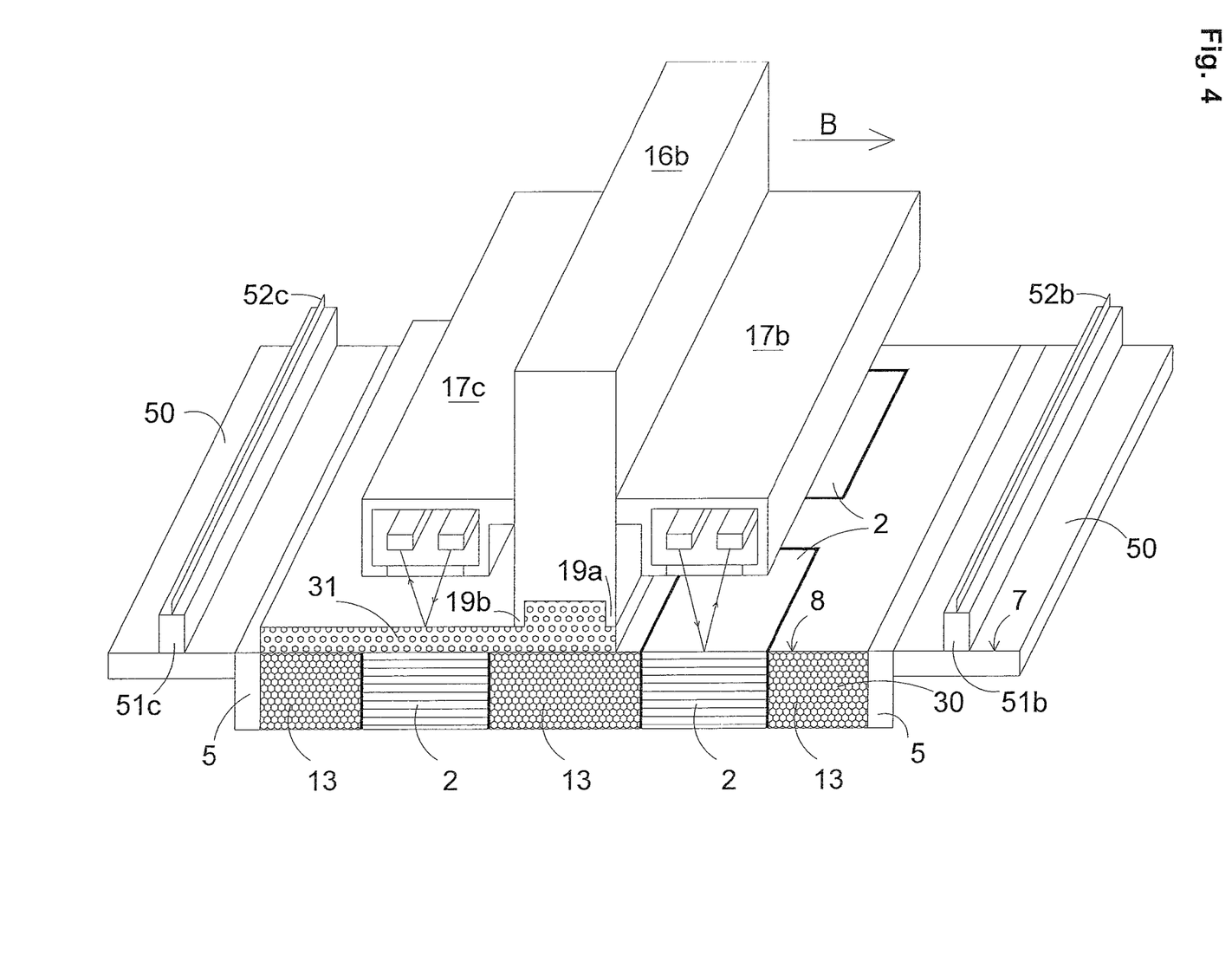
FIG. 4 is a schematic, not drawn to scale, perspective partial view of a region inside the device shown in FIG. 1 and shows, inter alia, a recoater according to a third embodiment of the present invention included therein.

FIG. 4 is a schematic, not drawn to scale, perspective partial view of a region inside the process chamber 3 of the device 1 shown in FIG. 1 and shows, inter alia, a recoater 16b according to a third embodiment of the present invention.

The third embodiment represents a combination of the first and the second embodiment. The recoater 16b contains two scanning devices 17b, 17c, of which the scanning device 17b is arranged in front of the recoater 16b in the application direction B, i.e. the movement direction of the recoater 16b, and the scanning device 17c is arranged behind the recoater 16b. Correspondingly, also a wiper 51b, 51c having a wiping element 52b, 52c is respectively arranged on both sides of the build area 8.

The construction of the recoater 16b and of the scanning devices 17b, 17c is respectively as described in the first or, respectively, the second embodiment.

By the combination of the scanning devices according to the first and second embodiment, also a combination of the effects which can be respectively achieved with the first and the second embodiment can be achieved. In the course of this, the scanning device 17b takes on the functions of the scanning device 17 of the first embodiment, and the scanning device 17c those of the scanning device 17a of the second embodiment.

This embodiment is particularly advantageous with a recoater moving back and forth, with which a recoating is carried out both in the application direction B shown in FIG. 4 and in the direction opposite thereto. During a movement in the opposite direction, the powder is stretched by the blade 19a to a uniform layer. In the course of this, the scanning device 17c takes on the functions of the scanning device 17 of the first embodiment, and the scanning device 17b those of the scanning device 17a of the second embodiment.

Beside the possibilities of evaluating an image of the powder bed captured by a scanning device mounted at the recoater described in the above embodiments, the present invention offers still further possibilities, especially of calibrating the device, i.e. for aligning and adjusting individual elements absolutely and relatively to each other.

In a first example, the deflecting device for the laser beam shall be calibrated. To this end, a pattern plate or foil to which a predetermined test pattern is applied is first applied to the support and the recoater is moved across it. In the course of this, the scanning device captures an image of the test pattern. From a comparison with the known dimensions of the test pattern and the image recorded by the scanning device, first correction data can be determined with which the scanning device can be calibrated. Thereby, coordinates of the recorded image (e.g. line, column of the image file) can be converted into real coordinates (e.g. mm in a XY plane).

Subsequently, a target is applied to the support instead of the pattern plate. The target can, for instance, be formed of a metal plate or a foil or of a material, such as photographic paper, reacting to laser radiation, so that a pattern irradiated by the laser beam remains in the target. Reference marks are then applied by the laser beam on this target. Instead of a target, also a powder layer previously applied to the support can be irradiated. After that, the recoater is moved across the target or, respectively, the powder layer, wherein the scanning device captures an image of the reference marks.

From a comparison of the actual positions of the reference marks (determined by means of the first correction data) with their desired positions predefined by the control unit, second correction data can be determined, with which the deflecting device can be calibrated. Thereby it can be ensured that, during operation, the actual positions of the irradiated regions coincide with their desired positions.

In a second example, the recoater and the support or, respectively, the building platform mounted thereon shall be aligned relatively to each other. This requires that the recoater and/or the support are mounted in the device such as to be alignable.

To this end, first, a pattern plate or foil to which reference marks are applied is applied to the support, and the recoater is moved across it. In the course of this, the scanning device captures an image of the reference marks. Moving the recoater across it and capturing an image of the reference marks is repeated several times, wherein the support is lifted or lowered by a predetermined height each time.

From a comparison of the recorded images with one another it can be determined which reference mark is reproduced most sharply in which image. From the number of the images lying between two sharp images of two reference marks, the predetermined height by which the support was lifted or lowered at each step, and the distance of the reference marks from each other, an angle can be determined at which the connecting line between the reference marks is tilted with respect to a plane across which the recoater has moved.

In the case of a rectangular build area, preferably, three reference marks are detected in three different corners, so that a tilt in two directions which are perpendicular to each other and, thus, the total spatial tilt between the plane across which the recoater has moved and the surface of the building platform can be determined.

The recoater and/or the support are then correspondingly readjusted by suitable measures. Thereafter, the procedure can be repeated in order to prove whether the alignment is correct now or, as the case may be, in order to further adjust it.

In a third example, an evenness of the support or, respectively, of the building platform mounted thereon shall be determined.

To this end, a pattern foil which conforms to the surface profile of the building platform and to which reference marks are applied is, first, applied to the building platform, and the recoater is moved across it. In the course of this, the scanning device captures an image of the reference marks. Moving the recoater across it and capturing an image of the reference marks is repeated several times, wherein the support is lifted or lowered by a predetermined height each time.

From a comparison of the recorded images with one another it can be determined which reference mark is reproduced most sharply in which image. Therefrom and from the position of the respective reference mark, an elevation profile of the building platform can be determined in a manner similar to the preceding example. To this end, for instance, a test pattern having several reference marks distributed over the entire building platform is used.

If the determined elevation profile exceeds a prescribed limit value, the building platform can, for instance, be replaced by another one. Alternatively, the determined elevation profile may, however, also be used for intervening in the operation of the device and controlling it, for instance, by changing process properties, such as working temperature or movement velocity and power of the laser beam, in order to account for local thickness variations of the first powder layer directly applied to the building platform which are caused by the elevation profile of the building platform.

Instead of applying a test pattern, the reference marks can also be irradiated by the laser on a target. Alternatively, the building platform can also be directly irradiated by the laser. Thereby, measurement errors caused by a deficient fitting of the pattern foil or of the target to the building platform can be prevented.

Whereas the scanning devices are mounted at the recoater in the above embodiments, they can also be provided separately from the recoater and be movable across the working plane together with it or separately from it.

A static scanning unit having a line sensor, i.e. a one-dimensional array of detector elements, makes it only possible to determine the space coordinates of a point or, respectively, of a row of points along an extension of the line sensor. In order to be able to scan the whole build area, a static scanning unit would need to have a pivotable line sensor or a camera having a suitable x/y-resolution. In contrast, the scanner according to the present invention which includes a line sensor and is arranged being movable across the build area can, for instance, have a simple construction and provide a 3D information of the entire surface of the build area. Such a scanner movable across the build area can be realised in a particularly advantageous manner by arranging the scanning unit at a recoater moving across the build area, irrespective of whether it is arranged in front of or behind the recoater in the movement direction of the recoater or whether one scanning unit is respectively arranged on either side of the recoater.

A scanning unit mounted at the recoater, namely in front of the recoater in movement direction, can, for instance, measure a relief of a selectively solidified powder layer including locating elevations and depressions with respect to a standard level. In the course of this, it is about capturing a state after a solidification of the building material. In the course of this, the recoater is preferably constructed such as to non-selectively apply the building material, not only to the points corresponding to the cross-section of the object to be manufactured. Preferably, it applies the building material across the total area of the object to be manufactured, in a further preferred manner across the total build area. When the solidification of the building material is performed by means of a light source which is also moved across the build area, it is also possible to mount the scanning unit behind it in the movement direction. For instance, in a combined device movable across the build area, it is possible to arrange a recoater ahead in the movement direction, an irradiator behind it, and the mentioned scanning unit further behind.

A scanning unit mounted at the recoater also has the advantage of being arranged closer at the build area and, thus, at the surface of a layer to be monitored than a scanner monitoring the total build area. This, for instance, results in a raised accuracy and reliability of capturing due to avoiding scanning through a cloud of smoke/splash/condensate wafting in the process chamber above the build area. This effect frequently occurring particularly when melting/sintering metal powder by means of a laser or, respectively, electron beam is a problem solved by the present invention, whereas this problem will not arise in this form when melting/sintering plastic powder, in the stereolithography, in the Fused Deposition Modeling, or other methods of the 3D printing.

A further advantage is, for instance, that no shadowing effects by the recoater housing in the capturing region of, for instance, a scanner capturing the total build area from a central position above the build area occur. Further, for instance, a variable or, respectively, unfavourable coverage angle of a scanner of this type on the build area, which can lead to a limited quality of results of the measurements, does not occur. Mounting the scanning unit(s) at the recoater saves its own drive as well as a coordination of the movement of the scanning unit, for instance, with a control unit of a recoater drive.

An advantage of arranging a scanning unit behind the recoater in the movement direction is, for instance, determining a quality of the recoating with regard to deviations of an actual height level of an applied layer from a desired level, namely in a potentially fine resolution and relating to depressions and bulges. This makes a subsequent dosing of powder possible, as the case may be, in the case of a too low application, wherein the powder volume to be subsequently dosed can be accurately calculated via a target-actual-comparison and wherein locating the position/extension of a depression, for instance, also allows a selective subsequent dosing. Furthermore, a quick identification of a defect of the stretching blade of the recoater is made possible in the case of a higher level than actually allowed by the blade.

An advantage of arranging a scanner in front of the recoater in the movement direction is, for instance, determining a quality of a build process with regard to deviations of an actual height level of a solidified layer from a desired level, namely in a potentially fine resolution and relating to depressions and protruding peaks/edges. This makes a compensating increased dosing of powder during the next layer application and/or an adjustment of process parameters, in particular, irradiation parameters, possible in the case of an increased material shrinking (e.g. due to a too high energy input by a laser). In the course of this, the powder volume to be additionally dosed can be accurately calculated via a target-actual-comparison. In the case of detecting a superelevation of a solidified region (e.g. due to the curling effect while melting/sintering metal powder), e.g. a build process can be stopped at the right time in order to prevent damaging the recoater or undesired effects (e.g. vibrations) due to a collision of a recoater blade with the superelevated subarea of the solidified region.

An advantage of the alternative where respectively one scanning unit is provided in front of the recoater and behind the recoater in a movement direction lies, for instance, in the fact that the scanning unit arranged in front of the recoater in the movement direction takes on a scanning of the surface of a layer already solidified and the scanning unit arranged behind the recoater in the movement direction takes on a scanning of a layer application. The advantages, in particular, arise when recoating in two opposed directions (movement back and forth). Then, the two scanning units alternately take on the scanning of a solidified surface (object) and a surface remaining non-solidified (powder bed) depending on the respective movement direction.

Even though the present invention has been described on the basis of a laser sintering or, respectively, laser melting device, it is not limited to the laser sintering or laser melting. It may be applied to arbitrary methods of manufacturing a three-dimensional object by a layer-by-layer application and selective solidification of a building material.

The irradiator may, for instance, comprise one or more gas or solid state lasers or any other type of lasers, such as e.g. laser diodes, in particular VCSEL (Vertical Cavity Surface Emitting Laser) or VECSEL (Vertical External Cavity Surface Emitting Laser), in particular, a line of these lasers. Generally, any device by means of which energy can be selectively applied to a layer of the building material as wave or particle radiation may be used as irradiator. Instead of a laser, for instance, another light source, an electron beam, or any other energy or, respectively, radiation source may be used which is suitable for solidifying the building material. The invention may also be applied to the selective mask sintering, where an extended light source and a mask are used, or to the High-Speed-Sintering (HSS), where a material enhancing (absorption sintering) or reducing (inhibition sintering) the absorption of radiation at the points corresponding to the object cross-section is selectively applied onto the building material, and then an irradiation is performed non-selectively in a large-area manner or using a movable line irradiator.

Instead of supplying energy, the selective solidification of the applied building material may also be performed by 3D printing, for instance, by applying an adhesive. Generally, the invention relates to manufacturing an object by means of a layer-by-layer application and selective solidification of a building material, independently of the manner in which the building material is being solidified.

Various kinds of building materials may be used, in particular, powders such as e.g. metal powder, plastic powder, ceramic powder, sand, filled or mixed powders. In the course of this, the building material may contain a powder or be formed solely of powder.

The invention claimed is:

1. A recoater for applying a layer of building material in a device for manufacturing a three-dimensional object within a build area by means of selectively solidifying layers of the building material at the points corresponding to respective cross-section of the object, wherein the recoater is suitable for applying a building material layer by moving across the build area in a movement direction, the recoater comprising:
   a longitudinal axis arranged across the build area and along which the recoater is elongated;
   a first scanning device carried on the recoater and including a first line sensor which is directed to capture at least a subarea of the build area, a longitudinal extension of the first line sensor is transverse to the movement direction of the recoater, and a recording area of the first line sensor extends along a length of the recoater which is engaged in the application of the building material, the first scanning device including the first line sensor sensing and recording at least a subarea of the build area at least during application of building material across the build area by the recoater,
   wherein the first scanning device includes a light source which extends along the length of the recording area of the first line sensor, the light source being formed by an elongated light source or by an array of adjacent light sources spaced across the light source,
   wherein the first scanning device is arranged in front of the recoater in the movement direction of the recoater to capture dimensions and/or surface finish of the solidified regions of the layer already selectively solidified based on the image of at least the subarea of the build area captured by the scanning device, or
   wherein the first scanning device is arranged behind the recoater in the movement direction of the recoater to capture unevenness and/or defects in the newly applied layer based on the image of at least the subarea of the build area captured by the scanning device.

2. The recoater according to claim 1, further comprising a second scanning device including a second line sensor, for capturing at least a subarea of the build area,
   wherein the second scanning device is arranged on an opposite side of the recoater than the first scanning device.

3. The recoater according to claim 2, wherein
   the longitudinal extension of the second line sensor is transverse to the movement direction of the recoater for the application of the building material; and
   a recording area of the second line sensor extends substantially along a total area of the recoater suitable for the application of the building material.

4. The recoater according to claim 1, wherein the first line sensor and/or a second line sensor of a second scanning device for capturing at least a subarea of the build area comprises a CCD line sensor, a CMOS line sensor, or a line of photodiodes, bolometers, or pyroelectric sensors.

5. The recoater according to claim 2,
   wherein the second scanning device includes a light source which extends along a total recording area of the second line sensor,
   wherein the light source is formed by an elongated light source or by an array of point-shaped light sources.

6. The recoater according to claim 1, wherein the first scanning device and/or a second scanning device including a second line sensor for capturing at least a subarea of the build area is at least in parts detachably mounted at the recoater.

7. A device for manufacturing a three-dimensional object within a build area by applying layers of a building material and selectively solidifying the layers at the points corresponding to a respective cross-section of the object, comprising:
   a recoater movable across the build area and being suitable for applying a building material layer by moving across the build area in a movement direction; and
   at least one scanning device carried on the recoater and including a line sensor suitable for capturing at least a subarea of the build area, wherein a longitudinal extension of the line sensor is transverse to the movement direction of the recoater and wherein a recording area of the line sensor extends substantially along the total area of the recoater suitable for the application of the building material, the scanning device including the line sensor sensing and recording at least a subarea of the build area at least during application of building material across the build area by the recoater,
   wherein the scanning device includes a light source which extends along the total recording area of the line sensor, the light source being formed by an elongated light source or by an array of point-shaped light sources, and
   wherein the scanning device is arranged in front of the recoater in the movement direction of the recoater to capture dimensions and/or surface finish of the solidified regions of the layer already selectively solidified based on the image of at least the subarea of the build area captured by the scanning device, or
   wherein the scanning device is arranged behind the recoater in the movement direction of the recoater to capture unevenness and/or defects in the newly applied layer based on the image of at least the subarea of the build area captured by the scanning device.

8. The device according to claim 7, wherein
   the light source of the scanning device has a light emitting area that extends along a total recording area of the line sensor, and/or
   the scanning device is at least in parts detachably mounted at the recoater, and/or
   the device includes a wiper mounted outside the build area and having a wiping lip or a brush, for wiping an optical window of the scanning device.

9. A method of process control in a device for manufacturing a three-dimensional object by means of layer-wise applying and selectively solidifying a building material, comprising:
   providing a recoater movable across a build area and being suitable for applying a building material layer by moving across the build area in a movement direction; and
   providing at least one scanning device carried by the recoater and movable across the build area and including a line sensor suitable for capturing at least a subarea of the build area, wherein a longitudinal extension of the line sensor is transverse to the movement direction of the recoater, and a recording area of the line sensor extends substantially along a total area of the recoater suitable for the application of the building material, the scanning device further including a light source which extends along the total recording area of the line sensor, the light source being formed by an elongated light source or by an array of point-shaped light sources, and sensing and recording at least a subarea of the build area by means of the scanning device including the line sensor at least during application of building material across the build area by the recoater, wherein the scanning device is arranged in front of the recoater in the movement direction of the recoater so that, based on the image of at least the subarea of the build area captured by the scanning device, dimensions and/or surface finish of the solidified regions of the layer already selectively solidified are captured, or wherein the scanning device is arranged behind the recoater in the movement direction of the recoater so that, based on the image of at least the subarea of the build area captured by the scanning device, unevenness and/or defects in the newly applied layer are captured.

10. The method according to claim 9, wherein a device is used including an irradiation unit capable of emitting a wave or particle radiation suitable for solidifying the building material, wherein the process control includes a calibration of the irradiation unit comprising the following steps:

moving the scanning device across a test pattern having predetermined dimensions and recording an image of the test pattern;

comparing the recorded image with the predetermined dimensions of the test pattern and determining first correction data for calibrating the scanning device;

irradiating reference marks having predetermined desired positions by means of the irradiation device on a light-sensitive target or an applied layer of the building material;

moving the scanning device across the irradiated target or the irradiated layer and recording an image of the reference marks; and comparing actual positions of the reference marks determined by means of the first correction data from the recorded image with the desired positions of the reference marks and determining second correction data for calibrating the irradiation device.

11. The method according to claim 9, wherein a device is used including a vertically adjustable support carrying a building platform on which the object is to be built up or serving itself as a building platform, wherein the process control includes a determination of the alignment of the scanning device relatively to the support or the building platform comprising the following steps:

applying a test pattern having reference marks to the support or the building platform;

repeatedly moving the scanning device across the test pattern and recording an image of the test pattern, wherein the support is lifted or lowered by a predetermined height at each repetition;

determining which reference mark in which image is reproduced most sharply; and determining for at least two reference marks an angle at which a connecting line between the reference marks is tilted with respect to a plane covered by the movement of the scanning device, from the number of images lying between the images in which the reference marks are reproduced most sharply and the distance of the reference marks from each other.

12. The method according to claim 9, wherein a device is used including a vertically adjustable support carrying a building platform on which the object is to be built up or serving itself as a building platform, wherein the process control includes at least the following steps:

applying a test pattern having reference marks to the support or the building platform or irradiating the reference marks directly on the support or the building platform;

repeatedly moving the scanning device across the reference marks and recording an image of the reference marks, wherein the support is lifted or lowered by a predetermined height at each repetition;

determining which reference mark in which image is reproduced most sharply; and determining an elevation profile of the support or the building platform from the images in which the reference marks are reproduced most sharply and positions of the respective reference marks.

13. A recoater for applying a layer of a building material in an apparatus for manufacturing a three-dimensional object within a build area by means of selectively solidifying layers of the building material at the points corresponding to respective cross-section of the object, the recoater applying a building material layer by moving across the build area in a movement direction, comprising:

a longitudinal axis along which the recoater is elongated and arranged across the build area in use;

a first scanning device carried on the recoater with a first line sensor which is directed to sense a surface of at least a subarea of the build area, the first line sensor being elongated with a long axis transverse to the movement direction of the recoater, and a recording area of the first line sensor extending along the long axis and for a length of the recoater which is engaged in the application of the building material, the first scanning device including the first line sensor sensing and recording at least a subarea of the build area at least during application of building material across the build area by the recoater, wherein the first scanning device includes an elongated light source which extends parallel to the longitudinal axis of the recoater and also along the length of the recording area of the first line sensor but spaced from the first line sensor, the light source being formed by an elongated single light source or by an array of adjacent light sources spaced across the light source, the light source generating light which is directed to reflect off of the build area surface at least during movement of the recoater in applying a building material, the reflection being sensed by the first line sensor and recorded, wherein the first scanning device is arranged in front of the recoater in the movement direction of the recoater to capture dimensions and/or surface finish of the solidified regions of the layer already selectively solidified based on the image of at least the subarea of the build area captured by the scanning device, or wherein the first scanning device is arranged behind the recoater in the movement direction of the recoater to capture unevenness and/or defects in the newly applied layer based on the image of at least the subarea of the build area captured by the scanning device.

14. The recoater according to claim 13, wherein the recoater further comprises a second scanning device including a second line sensor for capturing at least a subarea of the build area, wherein the second scanning device is arranged on an opposite side of the recoater than the first scanning device.

15. The recoater according to claim 14, wherein
the longitudinal extension of the second line sensor is transverse to the movement direction of the recoater for the material application; and
a recording area of the second line sensor extends substantially along a total area of the recoater suitable for the application of the building material.

16. The recoater according to claim 14,
wherein the second scanning device includes a light source which extends along a total recording area of the second line sensor,
wherein the light source is formed by an elongated light source or by an array of point-shaped light sources.

* * * * *